(12) United States Patent
Andersson et al.

(10) Patent No.: US 6,629,172 B1
(45) Date of Patent: Sep. 30, 2003

(54) MULTI-CHIP ADDRESSING FOR THE I²C BUS

(75) Inventors: Anders Andersson, Pasadena, CA (US); Daniel Van Berkom, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/459,720

(22) Filed: Dec. 13, 1999

Related U.S. Application Data
(60) Provisional application No. 60/112,509, filed on Dec. 14, 1998.

(51) Int. Cl.[7] ................................................ G06F 13/00
(52) U.S. Cl. ...................................................... 710/104
(58) Field of Search ........................ 710/8, 9, 10, 104

(56) References Cited

U.S. PATENT DOCUMENTS

| | | | | |
|---|---|---|---|---|
| 5,204,669 A | * | 4/1993 | Dorfe et al. ............... | 340/3.31 |
| 5,636,342 A | * | 6/1997 | Jeffries ....................... | 710/9 |
| 5,974,475 A | * | 10/1999 | Day et al. .................. | 710/8 |
| 6,009,479 A | * | 12/1999 | Jeffries ...................... | 710/62 |
| 6,026,354 A | * | 2/2000 | Singh et al. ............... | 702/186 |
| 6,363,437 B1 | * | 3/2002 | Ptasinski et al. ........... | 710/10 |

* cited by examiner

*Primary Examiner*—Glenn A. Auve
(74) *Attorney, Agent, or Firm*—Dickstein Shapiro Morin & Oshinsky LLP

(57) ABSTRACT

The present invention is a system for assigning unique addresses to multiple devices attached to an I²C bus. When multiple devices share the same I²C address, the master device is unable to communicate with each device individually. Therefore, a circuit enable input is created to individually activate each device. Once a device is activated, the master device may communicate to the device a unique I²C bus address, after which the activated device only responds to the new address. Each device initially sharing the same address is activated individually until all devices have been assigned a unique address.

13 Claims, 3 Drawing Sheets

MULTI-CHIP ADDRESSING FOR THE I²C BUS

CROSS-REFERENCE TO RELATED APPLICATIONS

This application claims the benefit of priority under 35 U.S.C. §119(e) of U.S. Provisional Application No. 60/112,509, filed Dec. 14, 1998.

BACKGROUND OF THE INVENTION

In modern electronic systems there are a number of peripheral integrated circuits (ICs) that need to communicate with each other and with off-chip element. To maximize hardware efficiency and simplify circuit design, a simple bi-directional 2-wire, serial data (SDA) and serial clock (SCL) bus for inter-IC control (I²C) was developed. This I²C-bus supports any IC fabrication process and, with the extremely broad range of I²C-compatible chips, it has become the worldwide industry standard proprietary control bus.

Each device on the I²C-bus is recognized by a unique address and can operate as either a receiver-only device (e.g. an LCD Driver) or a transmitter with the capability to both receive and send information (such as memory). Transmitters and/or receivers can operate in either master or slave mode, depending on whether the chip has to initiate a data transfer or is only addressed. An I²C-bus is a multi-master bus, i.e. it can be controlled by more than one IC connected to it.

Devices on the I²C bus are selected by an 8-bit address which is sent over the bus in the same way as data bytes. The least significant bit of this address acts as a read/write control signal, and is set to 0 to make the Slave a Receiver and 1 to make the Slave a Transmitter.

The address byte is the first byte transmitted after a Start condition, and is always transmitted by the Master. By convention, if the Slave is a Receiver and the Slave contains several registers, then the next byte transmitted after the address is an internal register address for the device. However, this is not required by the I²C specification.

The address of a particular slave device is often determined when the I²C is manufactured. If there is more than one device with the same address on the I²C bus, it is difficult to access each device individually.

Therefore, each device.coupled to a system management bus based on the I²C protocol is required to have its own I²C address for proper operation of the bus. The current method for assigning addresses to agents on the bus is for the designer to provide a hard wired solution or provide dip switches or jumpers. Although hard address bits assigns every device to a unique address, this approach requires extra pads and requires the maximum number of devices capable of being attached to the bus to be determined upon fabrication. When the designer provides dip switches or jumpers, the user is required to either manually set the dip switches or jumpers or use configuration software to operate logical switches. This requirement to manually set switches or to operate switches through software can be both tedious and error prone. Therefore a system and method is desired for assigning unique addresses to devices on an I²C bus in a computer system after the devices are connected to the bus.

SUMMARY OF THE INVENTION

The present invention describes a system for automatically assigning unique addresses to multiple devices attached to an I²C bus. When multiple devices share the same I²C address, the master device is unable to communicate with each device individually. Therefore, a circuit enable input is created to individually activate each device sharing a common address. Once a device is activated, the master device may communicate to the device a unique I²C bus address, after which the activated device only responds to the new address. Each device initially sharing the same address is activated individually until all devices have been assigned a unique address.

One aspect of the present invention is a method of assigning addresses to a plurality of devices connected to a system management bus. The method comprises the steps of enabling a first of the plurality of devices and communicating a first address to the first of the plurality of devices. The method also includes the steps of indicating the first address is received by the first of the plurality of devices and enabling a second of the plurality of devices. A second address is communicated to the second of the plurality of devices. The method may further comprise the steps of indicating the second address is received by the second of the plurality of devices and then determining if additional devices are present. If additional devices are present, the method then enables a third of the plurality of and communicates a third address to the third of the plurality of devices.

Another aspect of the present invention is a system for assigning addresses on a bus having a data line. The system comprises a plurality of devices connected to the data line of the bus. Each of the devices has an enable input and an enable next output. The devices are connected so the enable next output of a first device is coupled to the enable input of a second device. A start signal is coupled to the enable input of the first device. When the start input is high, the first device communicates with the data line on the bus to receive a first address. The enable next output of the first device is then set high.

BRIEF DESCRIPTION OF THE DRAWINGS

These and other features and advantages of the invention will become more apparent upon reading the following detailed description and upon reference to the accompanying drawings.

DESCRIPTION OF THE PREFERRED EMBODIMENTS

Figure 1:
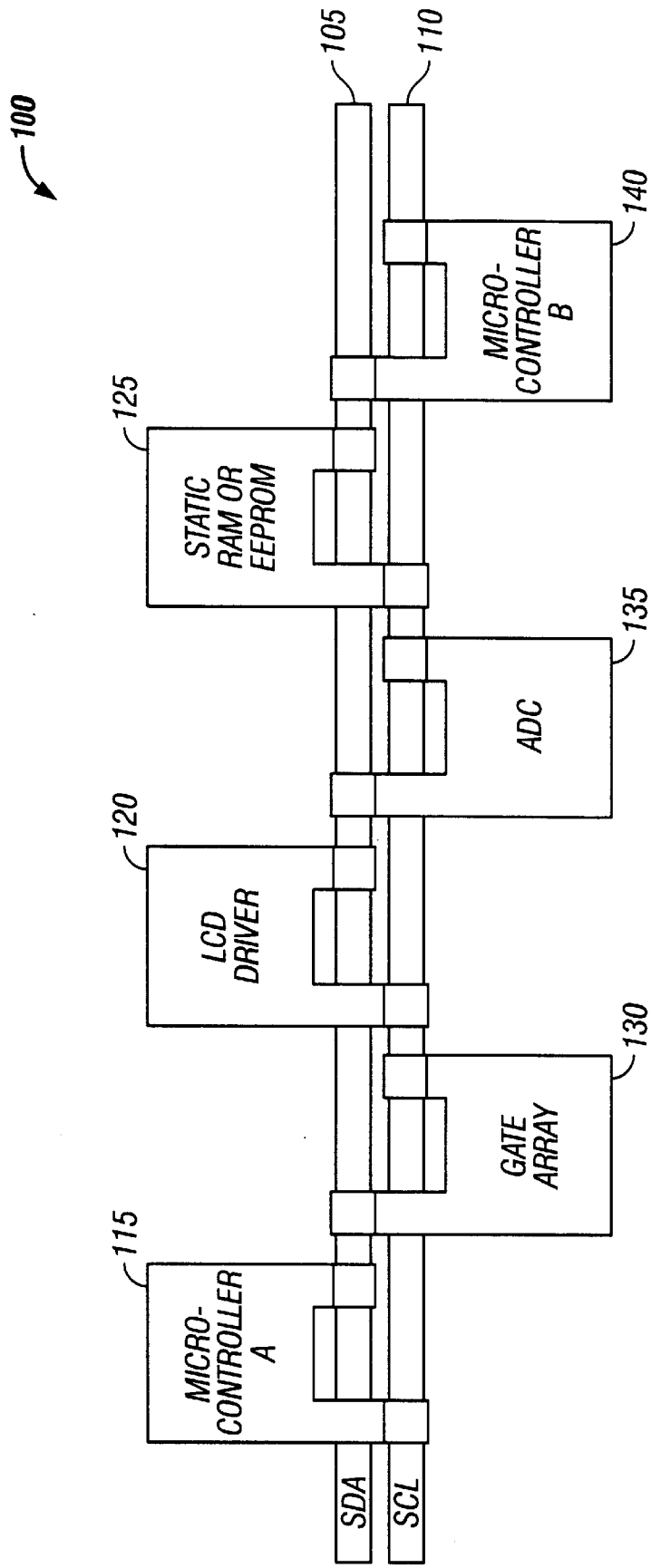
FIG. 1 is a diagram of a generic I²C bus with multiple devices connected to the bus.

FIG. 1 illustrates a generic I²C bus 100 having multiple devices connected to the bus 100. The I²C bus 100 includes a serial data line (SDA) 105 and a serial clock line (SCL) 110. Both the SDA 105 and the SCL 110 are bi-directional lines, connected to a positive supply voltage via a current-source or pull-up resistor (not shown). The I²C bus 100 of FIG. 1 has typical devices attached to the bus 100 such as a first micro-controller 115, a LCD driver 120, an EEPROM 125, a gate array 130, an ADC 135, and a second micro-controller 140. The number of devices attached to the bus is solely dependent on the bus capacitance limit of 400 pF.

Each of the devices communicates with the I²C bus via a unique address. The devices are classified as being either a master device or a slave device. A master device is a device that generates the clock signal, initiates the transfer, and terminates the transfer. A slave device is a device that is addressed by a master device. The I²C bus 100 is capable of functioning with multiple master devices, such as the first micro-controller 115 and the second micro-controller 140. A further description of the structure and operation of the generic I²C bus 100 may be found in the Philips Semiconductors I²C Bus Specification, Version 2.0, December 1998.

In operation, the I²C bus 100 allows communication between a m aster device and a slave device. When data exchange is desired, the master device addresses the slave device using the unique address of the slave device. After the slave device is addressed, the master device and;the addressed slave may exchange data via the SDA line 105 until the master device terminates the transfer. Because each device on the I²C bus 100 has a unique address, each device may be individually accessed by the master device.

Figure 2:
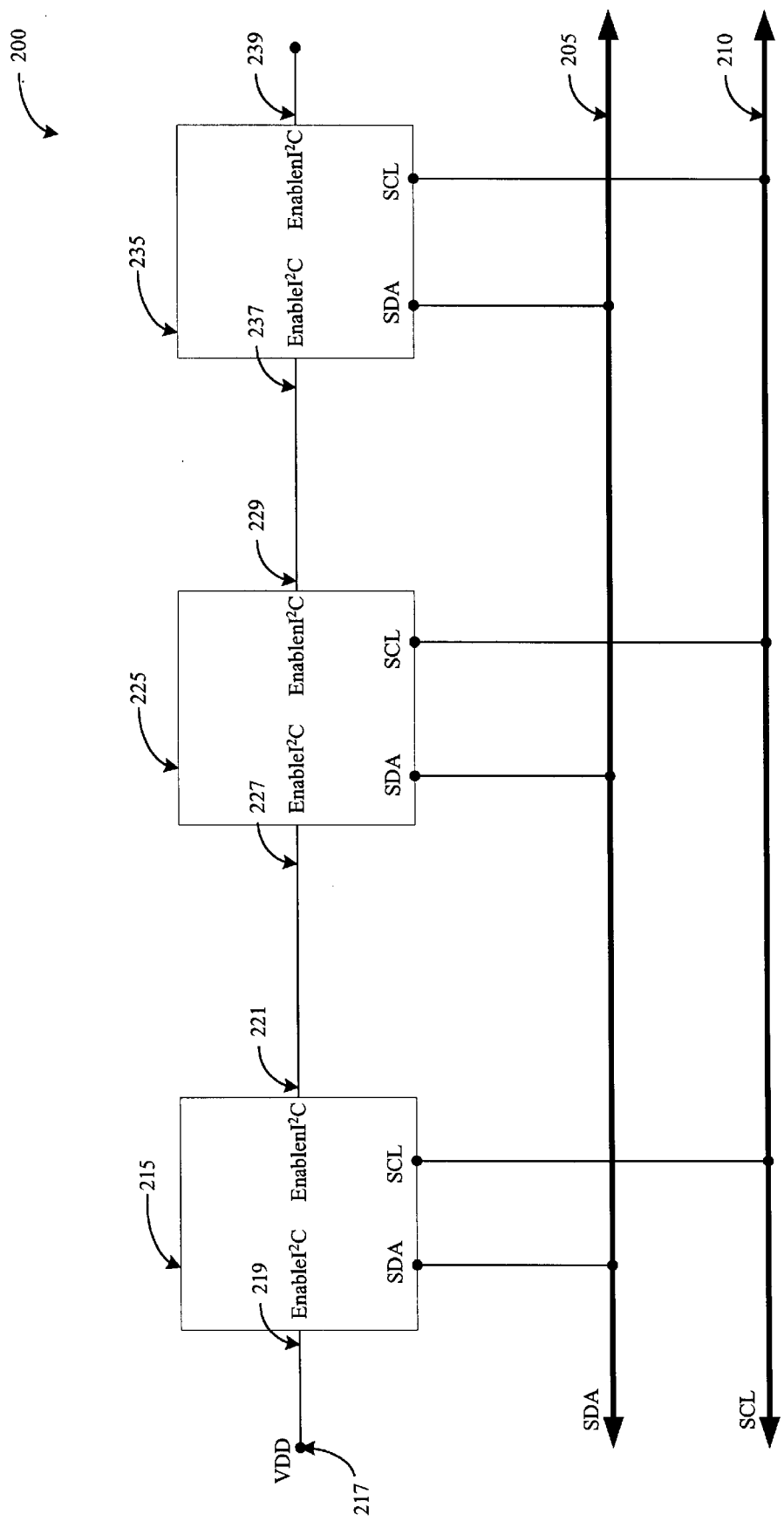
FIG. 2 is a block diagram of an I²C bus with multiple devices connected to the bus having address enable inputs according to the present invention.

FIG. 2 illustrates a portion of an I²C bus 200 in which a plurality of devices 215, 225, and 235 are connected. The I²C bus 200 includes a serial data line (SDA) 205 and a serial clock line (SCL) 210. The first device 215 includes an enable input (EnableI²C) 219 and an enable next output (EnablenI²C) 221. When active, the first device 215 communicates with the I²C bus 200 via bi-directional ports SDA and SCL. The second device 225 includes an enable input (EnableI²C) 227 connected to the enable next output (EnablenI²C) 221 of the first device 215. The second device 225 also includes an enable next output (EnablenI²C) 229. When active, the second device 225 communicates with the I²C bus 200 via bi-directional ports SDA and SCL. The third device 235 includes an enable input (EnableI²C) 237 connected to the enable next output. (EnablenI²C) 229,of the second device 225. The third device. 235 also includes an enable next output (EnablenI²C) 239. When active, the third device 235 communicates with the I²C bus 200 via bi-directional ports SDA and SCL. Although not shown, other devices not sharing the generic address may be connected to the I²C bus 100. These devices are not linked to any other devices and do not contain an enable input or an enable next output.

Figure 3:
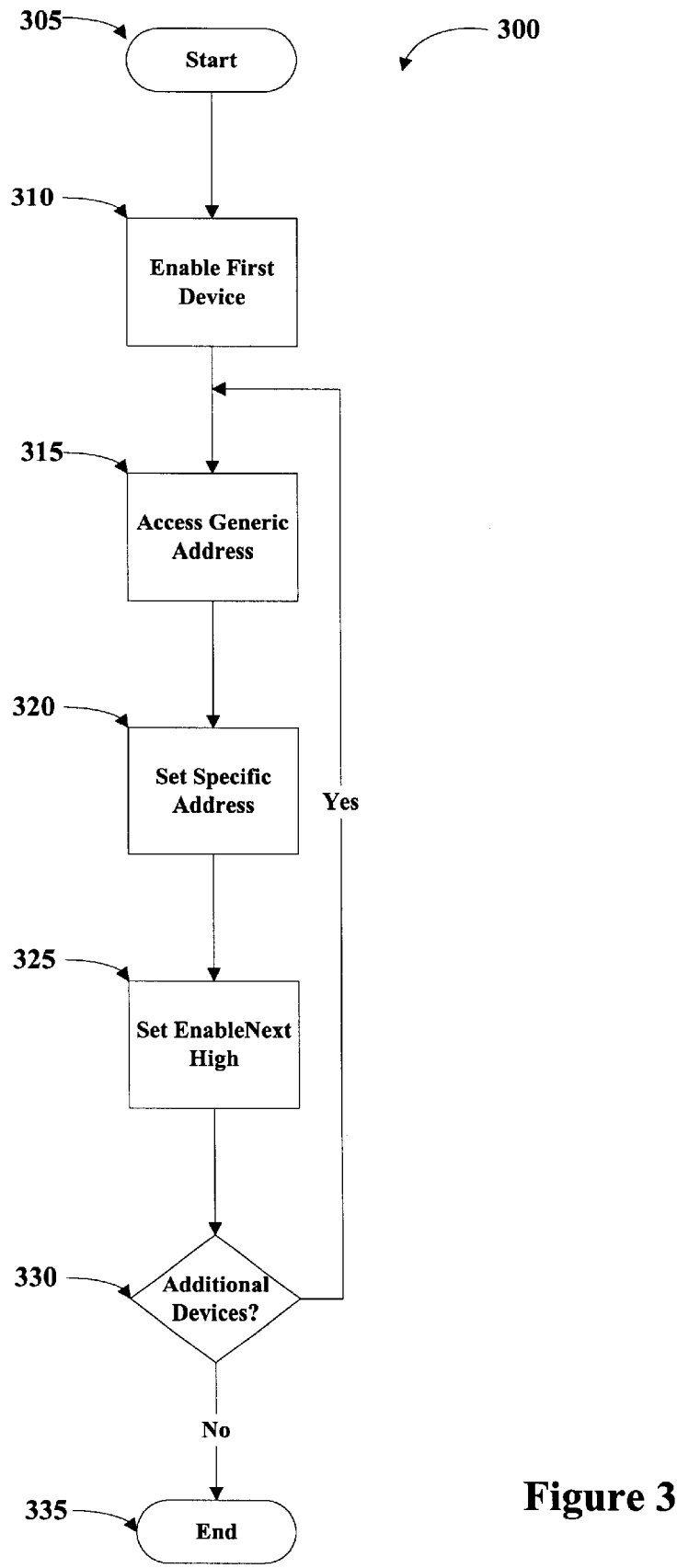
FIG. 3 is a flow chart illustrating the steps for assigning unique addresses to devices attached to the I²C bus according to the present invention.

FIG. 3 shows the process 300 of the present invention to assign unique addresses to the multiple devices on an I²C bus 100 that originally share a common, generic address. The operation of the process 300 will be described with reference to the circuit of FIG. 2., The process 300 begins at a start state 305. Initially, each device 215, 225, and 235 is not activated to communicate with the I²C bus 200. Therefore, any data transmitted along the SDA line 205 is not received by the devices 215, 225, and 235. Proceeding to state 310, the process 300 enables the first device 215. The first device 215 is enabled by applying a high voltage (VDD) 217 to the EnableI²C input 219. Activating the first device 215 allows communication between the first device 215 and the I²C bus 200.

The process 300 then proceeds to state 315 and the generic address is accessed along the I²C bus 200. Although each device 215, 225, and 235 shares the generic address, only the first device 215 is currently active. Therefore, only the first device 215 responds to the communication by the I²C bus 200. Proceeding to state 320, a first specific address for the first device 215 is transmitted along the SDA line 205. This first specific address is stored in the memory of the first device 215 and replaces the generic address within the first device 215. Once the address of the first device 215 is changed to the first specific address, the first device 215 remains active and only responds to the first specific address.

Proceeding to state 325, after changing addresses, the first device 215 sets the enable next (EnablenI²C) signal 221 high. The enable next signal 221 of the first device 215 is connected to the EnableI²C input 227 of the second device 225. When the enable next signal 221 of the first device 215 is high, the EnableI²C input 227 of the second device 225 goes high and the second device 225 is activated.

Proceeding to state 330, the process 300 determines if any additional devices are present that originally shared the generic address. In the present example, the second device 225 is present, so the process 300 proceeds along the YES branch to state 315, where the generic address is accessed by the I²C bus 200. At this time, both the first device 215 and the second device 225 are active, but the address of the first device 215 has been changed from the generic address. Therefore, only the second device 225 responds to the communication from the I²C bus 200.

Proceeding to state 320, a second specific address for the second device 225 is transmitted along the SDA line 205. This second specific address is stored in the memory of the second device 225 and replaces the generic address within the second device 225. Once the address of the second device 225 is changed to the second specific address, the second device 225 remains active and only responds to the second specific address.

Proceeding to state 325, after changing addresses, the second device. 225 sets an enable next (EnablenI²C) signal 229 high. The enable next signal 229 of the second device 225 is connected to the EnableI²C input 237 of the third device 235. When the enable next signal 229 of the second device 225 is high, the EnableI²C input 237 of the third device 235 goes high and the third device 235 is activated.

Proceeding to state 330, the process 300 determines if any additional devices are present that originally shared the generic address. In the present example, the third device 235 is present, so the process 300 proceeds along the YES branch to state 315, where the generic address is accessed by the I²C bus 200. At this time, each device 215, 225, and 235 is active, but the address of the first device 215 and the second device 225 are changed from the generic address. Therefore, only the third device 235 responds to the communication from the I²C bus 200.

Proceeding to state 320, a third specific address for the third device 235 is transmitted along the SDA line 205. This third specific address is stored in the memory of the third device 235 and replaces the generic address within the third device 235. Once the address of the third device 235 is changed to the third specific address, the third device 235 remains active and only responds to the third specific address.

Proceeding to state 325, after changing addresses, the third device 235 sets an enable next (EnablenI²C) signal 239 high. Because there are no additional devices that originally shared the generic address connected to the I²C bus 200, the enable next signal 239 of the third device 235 is not further connected.

Proceeding to state 330, the process 300 determines if any additional devices are present that originally shared the generic address. In the present example, no additional devices are present, so the process 300 proceeds along the NO branch to state 335 where the process terminates at the end block. At this point, each device 215, 225, and 235 have a unique address, and none of the addresses are the same. Of course, although an example having three devices was shown, it can be appreciated that any number of devices may originally be connected to the I²C bus 200 sharing the generic address. Numerous variations and modifications of the invention will become readily apparent to those skilled in the art.

Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for assigning addresses to a plurality of devices connected to a system management bus, the method comprising:

enabling a first device of the plurality of devices;

a controller communicating, using a generic address, a first address to the first device;

indicating that first address is received by the first of the plurality of devices;

enabling a second device of the plurality of devices; and the controller communicating, using the generic address, a second address to the second device;

wherein said first address is different form said second address.

2. The method of claim 1, further comprising:

indicating the second address is received by the second of the plurality of devices;

determining if additional devices are present;

enabling a third of the plurality of devices if present; and communicating a third address to the third of the plurality of devices if present.

3. The method of claim 2, wherein the third address differs from the first address and the second address.

4. The method of claim 1, wherein the addresses are communicated over a data line.

5. The method of claim 1, wherein the system management bus is an I$^2$C bus.

6. The method of claim 1, wherein the first address and the second address are communicated using a generic address.

7. A system for assigning addresses on a bus having a data line, the system comprising:

a plurality of devices connected to the data line of the bus having an enable input and an enable next output, the plurality of devices having an initial generic address, wherein the plurality of devices are connected so the enable next output of a first of the plurality of devices is coupled to enable input of a second of the plurality of devices; and a start signal coupled to the enable input of the first of the plurality of devices, wherein the first of the plurality of devices communicates with the data line on the bus to receive, over the initial generic address, a first address from a controller, when the start input is high;

wherein the enable next output of the first of the plurality of devices is set high after the first address is received.

8. The system of claim 7, wherein the first enable next output being high activates a second enable input.

9. The system of claim 8, wherein a second of the plurality of devices communicates with the data line when the second enable input is activated.

10. The system of claim 9, wherein the second of the plurality of devices communicates with the data line to receive a second address.

11. The system of claim 10, wherein the first address is different from the second address.

12. The system of claim 10, wherein the second enable next output of the second of the plurality of devices is set high after the second address is received.

13. The system of claim 7, wherein the bus is an I$^2$C bus.

* * * * *

UNITED STATES PATENT AND TRADEMARK OFFICE
CERTIFICATE OF CORRECTION

PATENT NO. : 6,629,172 B1
DATED : September 30, 2003
INVENTOR(S) : Anders Andersson et al.

It is certified that error appears in the above-identified patent and that said Letters Patent is hereby corrected as shown below:

Column 2,
Line 24, "of and" should read -- of devices and --.

Column 3,
Line 14, "and; the" should read -- and the --.

Column 5,
Line 26, "form" should read -- from --.

Signed and Sealed this

Twenty-third Day of December, 2003

JAMES E. ROGAN
*Director of the United States Patent and Trademark Office*